United States Patent [19]
Wood

[11] 3,769,541
[45] Oct. 30, 1973

[54] LINE WIDTH MODULATED DISPLAY SYSTEM

[75] Inventor: David E. Wood, Schenectady, N.Y.

[73] Assignee: General Electric Company, Schenectady, N.Y.

[22] Filed: Sept. 28, 1971

[21] Appl. No.: 184,343

[52] U.S. Cl. .............................. 315/22, 324/77 B
[51] Int. Cl. ............................................ H01j 29/70
[58] Field of Search .............. 324/77 R, 77 A, 77 B; 315/22, 18, 30

[56] References Cited
UNITED STATES PATENTS

| | | | |
|---|---|---|---|
| 3,382,436 | 5/1968 | Wil | 315/22 |
| 3,440,480 | 4/1969 | Henderson | 315/18 |
| 3,519,876 | 7/1970 | Murray | 315/22 |
| 3,573,786 | 4/1971 | Schira | 315/22 |

Primary Examiner—Carl D. Quarforth
Assistant Examiner—J. M. Potenza
Attorney—Frank L. Neuhauser et al.

[57] ABSTRACT

In a two dimensional display, the width of the line trace is modulated according to displacement in one direction of the display. Utilizing an oscilloscope as the display mechanism, for example, a plurality of closely spaced sawtooth waveforms in the vertical coordinate are utilized in producing the trace as it is scanned in the horizontal coordinate. Width modulation is obtained by modulating the beam intensity between an on and off condition.

8 Claims, 3 Drawing Figures

PATENTED OCT 30 1973  3,769,541

LINE WIDTH MODULATED DISPLAY SYSTEM

This invention relates to two dimensional displays, and in particular to apparatus for providing a two dimensional display having improved visual significance.

In the display art, a great deal of information is often displayed simultaneously, thereby requiring the viewer to assimilate a large amount of information from a relatively complex source. The task is burdensome and often tedious. Attempts to simplify the display generally result in a loss of information detail.

Two dimensional display devices are utilized in a wide variety of arts, wherever it is desired to compare one variable with another; for example, a parameter (such as voltage, pH, oxygen level, literally any parameter that can be converted via transducer into a voltage) vs. time, a parameter (such as vibration) vs. distance, or one parameter vs. another, such as amplitude vs. frequency or time vs. distance.

To consider but one of the areas wherein two dimensional displays can be enhanced, the present invention is described herein with respect to spectrum analyzers.

As is known, complex waves are produced by a wide variety of sources, e.g. the human voice, a heartbeat, and mechanical devices. In order to analyze these complex waves, various spectrum analyzers have been devised which provide as an output an indication of amplitude vs. frequency, generally on orthogonal coordinates. In one type of display, known as a spectrogram, a plurality of traces are spaced slightly apart on a recording medium, such as photographic film. The composite of such traces is then viewed in an attempt to find characteristics of a particular complex wave source. For example, the concept of using "voiceprints" as a means of identifying a particular person relies on the characteristics of each individuals voice.

However, simply displaying a plurality of adjacent traces of uniform line width, having frequency as the ordinate and amplitude as the abscissa, results in a maze of lines conveying little visual significance.

In an attempt to overcome this, there are provided in the prior art a variety of mechanisms for modulating the intensity of the line used to trace the amplitude vs. frequency curve. For example, in utilizing a cathode ray tube as the display device, the intensity of the electron beam is modulated in accordance with the amplitude of the signal being displayed. This type of display system is encumbered at the outset by limitations in the sensitivity of the recording medium, i.e. below a certain level the signal is not recorded and above a certain level the medium saturates or, worse, distorts the recorded indication of the signal. Logarithmic compression of the amplitude of the recorded signal has been used to alleviate this problem, but the result is not entirely satisfactory.

In addition, intensity modulated displays are difficult to study for details of spectrum amplitude and precise time determination. These difficulties can be overcome to some extent by displaying the actual spectra and expanding the time scale. However, simply doing this tends to produce the maze of lines referred to above.

In view of the foregoing, it is therefore an object of the present invention to provide improved two dimensional display apparatus.

It is another object of the present invention to provide a display in which the display has significant overall visual impact and, simultaneously, yields detailed information.

It is a further object of the present invention to provide display apparatus in which the display is independent of the sensitivity range of the display medium.

The foregoing objects are achieved in the present invention wherein apparatus is provided for modulating the line width of a display signal. In a preferred embodiment employing a cathode ray tube, for example, the line width is increased "downward," i.e. in the direction of lower amplitude in an amplitude vs. frequency trace, so that the upper boundary of the trace represents actual amplitude. The width of the trace is adjusted so that, at maximum amplitude levels, consecutive traces almost touch. In this way, the portion of display area covered by the trace varies in accordance with amplitude to create the visual effect of a gray scale.

The line width modulation is specifically provided by a ramp or sawtooth generator coupled to the amplitude input of the display mechanism. The line width is determined by the extent of a plurality of closely spaced sawtooth traces. A comparator means compares the amplitude of the input signal to the amplitude of the sawtooth to produce a control signal that terminates the sawtooth trace when a particular trace length is obtained.

A more complete understanding of the present invention may be obtained by considering the following detailed description in conjunction with the accompanying drawings, in which.

Figure 1:
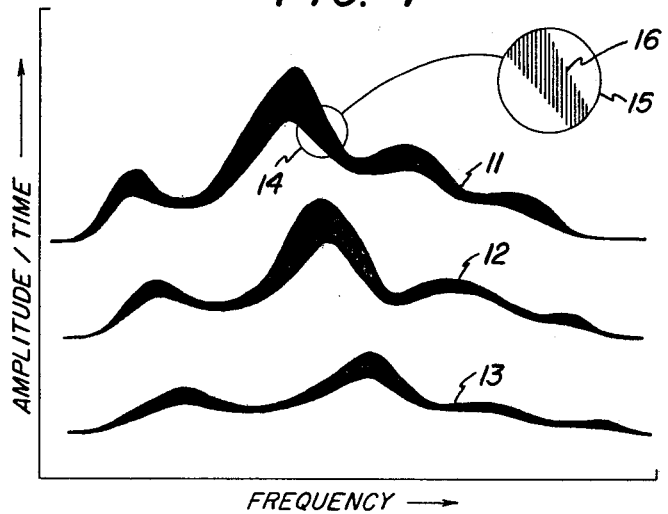
FIG. 1 illustrates waveforms as produced by a display in accordance with the present invention.

Referring to FIG. 1, there is illustrated a plurality of traces 11, 12 and 13 exhibiting the trace width modulation produced by the present invention. A section 14 of trace 11 is enlarged in area 15 to illustrate what the trace produced by the present invention would look like if the resolution of the display medium were exceedingly high. Specifically, the width of traces 11, 12 and 13 is modulated by modulating the height of a plurality of sawtooth waveforms which deflect the trace in the amplitude direction. The result is a plurality of line segments 16 which together form the width modulated traces illustrated in FIG. 1.

For convenience in describing the present invention, it will be assumed that the specific display device chosen for use with the present invention is an oscilloscope having X-and Y-deflecting means as well as Z-axis (intensity) modulation capability. Such oscilloscopes are extremely well known in the art and are available from a variety of manufacturers such as Heath and Tektronix. Furthermore, it will be assumed that the X-coordinate direction when viewing the display corresponds to the band of frequencies being analyzed and that the Y-coordinate for a single trace corresponds to amplitude. The Y-coordinate for the plurality of traces taken together corresponds to time as noted on the ordinate of FIG. 1.

As is well known, spectrum analyzers generally comprise a mechanism for scanning a band of frequencies and producing an output signal corresponding to the amplitude detected at the various frequencies within the band. Generally, where an oscilloscope is utilized as the display device, the amplitude signal is coupled to the vertical deflection system of the oscilloscope and the frequency indicating signal, generally a sawtooth waveform, is coupled to the horizontal deflection system of the oscilloscope. The Z-axis input of the oscilloscope has applied thereto the amplitude signal from the spectrum analyzer. The result is a plurality of linear traces of variable intensity which serve to indicate by a "gray scale" the nature of the complex wave applied to the spectrum analyzer.

As previously noted, in addition to being limited by the range of sensitivity of the display medium, in this case the phosphor on the face of the oscilloscope, This type of display cannot yield quantitative information as is frequently desired.

In the present invention, the high amplitude portions of each trace are broadened so as to provide a gray scale effect without intensity modulating the electron beam. As will be more fully described hereinafter, the electron beam is intensity modulated but only between an on and off condition so as to provide the width modulation as will be more fully described in conjunction with FIG. 2.

Figure 2:
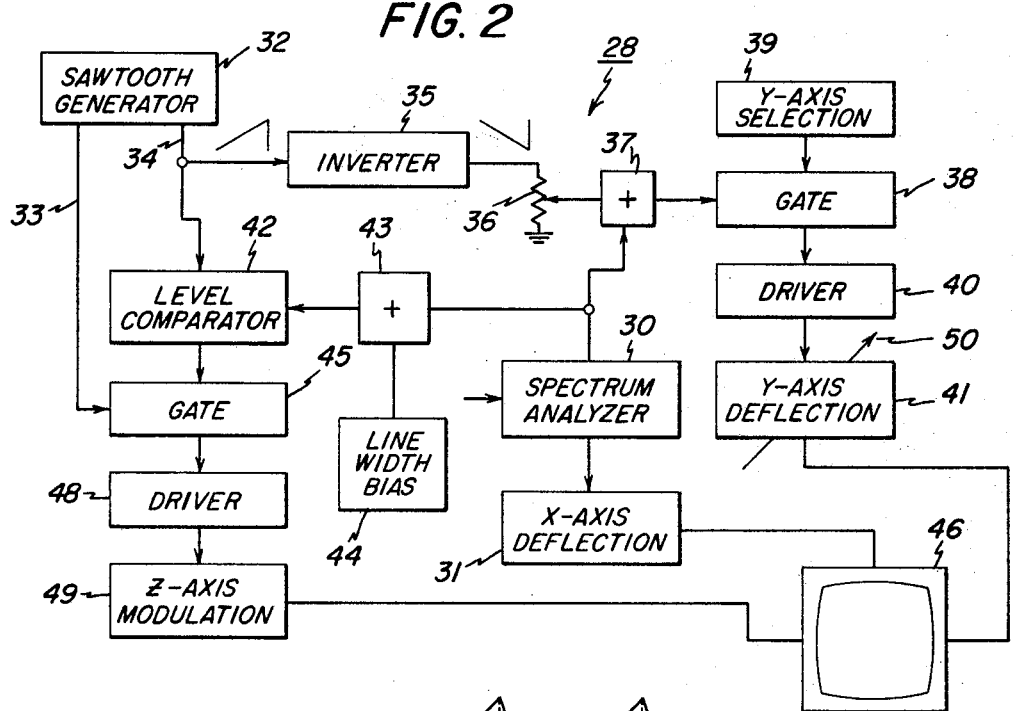
FIG. 2 illustrates apparatus in accordance with the present invention for producing a modulated line width display.

FIG. 2 illustrates a preferred embodiment of the present invention for producing a variable width trace. Generally, this embodiment of the present invention contains two groups of elements for producing a variable width trace. Continuing the example of an oscilloscope display mechanism, an electron beam is usually scanned in a horizontal direction across the face of the oscilloscope under the control of a sawtooth waveform. One group of elements in accordance with the present invention provides a second sawtooth, scanning in the vertical direction, thereby providing a wider trace. The second group of elements in accordance with the present invention varies the length of the vertical scans by intensity modulating the trace between an on and off condition. The intensity modulation is carried out in accordance with the amplitude of the input signal. The net result is a trace that is width modulated in accordance with the amplitude of the input signal.

Specifically, FIG. 2 illustrates line width modulating apparatus 28 comprising a spectrum analyzer 30, which may comprise a conventional spectrum analyzer producing output signals indicative of the amplitude vs. frequency characteristics of an input complex waveform, is coupled to X-axis deflection means 31 and applies thereto a signal indicative of the particular frequency being analyzed. In one form of spectrum analyzer for example where a voltage controlled oscillator is scanned across a band of frequencies under the control of a sawtooth waveform, the signal applied to X-axis deflection means 31 may simply comprise the sawtooth waveform that is controlling the voltage controlled oscillator within spectrum analyzer 30. The other output from spectrum analyzer 30 contains the amplitude signals of the spectrum. These signals are modified in two ways and utilized in conjunction with sawtooth waveforms produced by sawtooth generator 32. Sawtooth generator 32 has a pair of outputs 33 and 34 at which there are produced retrace blanking and sawtooth signals respectively. The sawtooth signals at output 34 are coupled by way of inverter 35 to a proportioning element 36 illustrated in FIG. 2 comprising a potentiometer. A portion of the signal applied across potentiometer 36 is coupled to summing network 37 where the inverted sawtooth waveform is combined with the amplitude signal from spectrum analyzer 30. The output signal from summation network 37 is applied to gate 38 having the other input coupled to Y-axis selector 39. The output of gate 38 is coupled to Y-axis deflection means 41 by way of suitable driving circuitry represented by driver 40.

The output from spectrum analyzer 30 is also applied to one input of a two-input summation network 43. The other input thereof is connected to line width bias means 44 whose function will be more fully explained below. The output from summation network 43 is coupled to level comparator 42 where it is compared in amplitude with sawtooth waveform on output 34 produced by sawtooth generator 32. The output of level comparator 42 is coupled to one input of gate 45 which blocks or passes signals from comparator 42 to driver 48. A retrace blanking signal from sawtooth generator 32 is coupled to the other input of gate 45. The output of gate 45 is coupled to Z-axis modulation means 49 by way of suitable driver circuitry 48. The X-, Y- and Z-axis deflection means are coupled to cathode ray tube display means 46.

The overall operation of the apparatus of FIG. 2 may best be understood by considering the illustrations of FIGS. 1 and 10. It will be noted that in FIG. 1 insert 15 is provided, showing in detail the vertical scannings 16 that are used to make up the variable trace width of trace 11. Considering the operation of one half of the circuitry of FIG. 2, the amplitude signal from spectrum analyzer 30 is coupled to summation network 37. If proportioning element 36 were adjusted so that no signal from sawtooth generator 32 were provided, then the output signal to Y-axis deflection means 41 is approximately the same as if no trace width modulation apparatus were provided. That is to say, Y-axis deflection means 41 would simply trace out the amplitude vs. frequency characteristic of the spectrum as provided by spectrum analyzer 30. When, however, proportioning device 36 is adjusted so that a predetermined amplitude sawtooth waveform is additively combined in summation network 37 with the amplitude signal from spectrum analyzer 30, the result is a broader tracing of uniform width of the amplitude vs. frequency signals as provided by spectrum analyzer 30. What is lacking is the apparatus for modulating the width of the sawtooth waveform. This apparatus is provided by elements 42–49 in FIG. 2.

Figure 3:
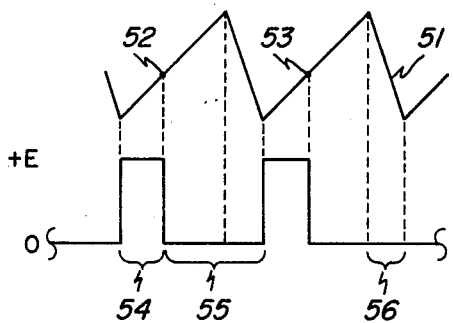
FIG. 3 illustrates waveforms useful in explaining the operation of the system of FIG. 9.

The amplitude signal from spectrum analyzer 30 is combined in summation network 43 with a line width bias signal which will be assumed for the moment to be at a minimum level. The output signal from summation network 43 is then compared with a sawtooth waveform in level comparator 42. The operation of level comparator 42 is illustrated in FIG. 3 wherein a sawtooth waveform 51 has selected points 52 and 53 indicated thereon as indicative of the amplitude level of the signal from spectrum analyzer 30. At points 52 and 53, the beam in the oscilloscope is cut off, thereby darkening the short, closely spaced, vertical traces provided by sawtooth generator 32 through elements 35–41.

As can be seen by inspection of FIG. 3, an increase in the amplitude of the signal from spectrum analyzer 30 would shift points 52 and 53 to the right thereby increasing the length of time that the beam in the oscilloscope is turned on, which consequently lengthens the short vertical traces being made as illustrated in FIG. 1 in insert 15. Conversely, as the amplitude from the signal of spectrum analyzer 30 decreases points 52 and 53 move to the left thereby decreasing the length of time that the electron beam within the oscilloscope display mechanism is turned on.

An indicated in FIG. 3, reference numeral 54 represents the time period when the oscilloscope beam is turned on. Reference numeral 55 designates the time period when the oscilloscope beam is turned off and reference numeral 56 represents the retrace blanking period occurring at the end of each sawtooth. Referring again to FIG. 1, and insert 15, as the on time of the electron beam is increased, the vertical height of individual scan 16 is also increased. Thus, for high amplitude signals the width of the trace is wider than for low amplitude signals in the spectrum.

Additional features in the preferred embodiment as illustrated in FIG. 2 include inverter 35. The function of inverter 35 is to insure that the upper edge of traces 11, 12 and 13 represents the true amplitude of the amplitude signal from spectrum analyzer 30. By the insertion of inverter 35, the scan produced by the sawtooth waveform from sawtooth generator 32 go from the actual amplitude level of the amplitude signal to a lower amplitude level as determined by the length of time the scan is permitted to continue by elements 42–49. Inverter 35 may be omitted, if desired, and the sawtooth waveform generated by generator 32 additively combined with the amplitude signal from spectrum analyzer 30.

Also illustrated in FIG. 2 is gate 38 coupled to Y-axis selection means 39. Gate 38 serves to display successive traces so that there is no overlap between successive traces, such as traces 11, 12 and 13 as illustrated in FIG. 1. Y-axis selection means 39 may comprise any suitable means and can comprise, for example, a stairstep voltage generator synchronized with the X-axis deflection so that for each scan across the frequency band, the Y-axis deflection is raised so as to give a suitable displacement between successive traces. The amount of displacement will obviously be determined by the size of the step. The width of the individual trace is preferably adjusted so that for a maximum amplitude signal from spectrum analyzer 30, the successive traces almost touch. Thus, a maximum density pattern is formed at the amplitude peaks from a plurality of successive traces.

It should not be considered that a stairstep signal from Y-axis selection means 39 is the only means by which successive traces may be suitably displaced. For example, if the output from the oscilloscope, which has been assumed for the sake of example in describing the preferred embodiment of the present invention, is recorded on, for example, photographic film, successive scans across the frequency band in the X-axis direction may be suitably synchronized with incremental advances in the film. In such a situation the output from summation network 37 would be applied directly to driver 40.

Another feature of the present invention illustrated in FIG. 2 is line width bias control 44. The line width bias shifts the spectrum cross section level relative to the comparison sawtooth signal to adjust the minimum line width of the plot. The minimum may be set at zero, if desired, so that spectrum amplitude signals below a certain level will not be shown at all. For the preferred embodiment of the present invention, the minimum line width is set at some finite value for representing minimum spectrum level.

The maximum line width is obtained by adjusting the gain of the vertical deflection system, as illustrated in FIG. 2 by control 50. The maximum width is adjusted so that, for maximum spectral amplitude, adjacent traces almost touch.

The retrace blanking signal on line 33 from sawtooth generator 32 is applied to the control input of gate 45 and prevents an output signal from being applied to Z-axis modulation means 49 so as to maintain the beam of the oscilloscope in an off condition. Spurious outputs are thereby prevented during the retrace blanking period 56 as indicated in FIG. 3.

Depending upon the setting of the parameters of trace spacing and the amount of deflection for a given input amplitude, a variety of effects is obtained. To continue the example of speech analysis, when the traces are closely spaced and a small deflection is utilized even for high amplitude signals, a visual impression is given as to the resonances within the mouth and throat of the speaker. Conversely, if wide trace spacing and large deflections are used, the visual impression created shows the variation with time of "phonation" components, i.e. corresponding to the puffs of air produced by the vocal cords during speech.

There is thus provided by the present invention an improved two dimensional display system wherein the trace width is modulated in accordance with trace displacement in one direction. The width modulation is accomplished by varying the length of a plurality of transverse scans used to form the trace. In a specific embodiment of the present invention, it is shown how this is accomplished by intensity modulating a transversely scanned sawtooth waveform in accordance with the amplitude of an input signal.

Having thus described the invention it will be apparent to those of ordinary skill in the art that various mofifications can be made without departing from the spirit and scope of the present invention.

I claim:

1. A display system comprising:
    input means for receiving an input signal to be displayed;
    display means coupled to said input means for displaying said signal as at least one line trace;
    local signal generating means for generating a comparison signal; and
    comparator means for comparing the amplitude of said input signal with said comparison signal and providing an output signal to said display means for varying the width of said line trace as a function of said comparison.

2. A display system as set forth in claim 1 wherein the displacement and width of said line trace is proportional to the amplitude of said input signal, the width of said line trace producing two distinguishable edges to said trace, and wherein the amplitude of said input signal is indicated by one of said edges.

3. A display system as set forth in claim 2 wherein said edge is the higher amplitude edge of said line trace.

4. A display system comprising:
    sawtooth generating means for producing a repetitive sawtooth waveform;
    input means for receiving input signals to be displayed;

comparator means for comparing the amplitude of said input signals with said sawtooth waveform and producing a control signal in accordance therewith;

blanking means coupled to and controlled by said control signal for selectively blanking the display; and means for combining said sawtooth waveform with the amplitude of said input signals to produce at least one line trace of variable width comprising a series of closely spaced scans in the amplitude direction of the display.

5. A display system as set forth in claim 4 wherein said combining means additively combines said sawtooth waveform with the amplitude of said input signals.

6. A display system as set forth in claim 5 wherein said combining means subtractively combines said sawtooth waveform with the amplitude of said input signals.

7. A display system as set forth in claim 4 and further comprising:

proportioning means interconnecting said sawtooth generating means and said combining means for varying the proportion of said sawtooth waveform in said combination of sawtooth and input signals.

8. A display system as set forth in claim 7 and further comprising minimum trace width control means coupled to the input of said comparator means for establishing the minimum width of said trace.

* * * * *